United States Patent
Yin et al.

(10) Patent No.: US 12,429,434 B1
(45) Date of Patent: Sep. 30, 2025

(54) DETECTION METHOD AND DEVICE FOR LOW CARRIER MOBILITY OF INSULATING MATERIAL

(71) Applicant: Shanghai Jiao Tong University, Shanghai (CN)

(72) Inventors: Yi Yin, Shanghai (CN); Su Zhao, Shanghai (CN); Zhe Zheng, Yancheng (CN); Luyao Zhong, Ma'anshan (CN); Xiaolei Zhao, Shanghai (CN); Yalin Wang, Shanghai (CN); Lu Fan, Yancheng (CN); Jiandong Wu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/202,101

(22) Filed: May 8, 2025

(30) Foreign Application Priority Data

Aug. 16, 2024 (CN) .......................... 202411126960.2

(51) Int. Cl.
*G01N 23/02* (2006.01)

(52) U.S. Cl.
CPC ......... *G01N 23/02* (2013.01); *G01N 2223/60* (2013.01)

(58) Field of Classification Search
CPC ............................ G01N 23/02; G01N 2223/60
See application file for complete search history.

(56) References Cited

FOREIGN PATENT DOCUMENTS

CN 117630615 A 3/2024

OTHER PUBLICATIONS

Zhao Xinyue et al., "Method for Measuring Carrier Mobility of Organic Optoelectronic Materials", Electro-Optic Technology Application, Feb. 2021, pp. 64-70, 80, vol. 36, No. 1.
CNIPA, Notification of Second Office Action for CN202411126960. 2, Feb. 26, 2025.
Shanghai Jiao Tong University (Applicant), Replacement claims (allowed) of CN202411126960.2, Mar. 26, 2025.
CNIPA, Notification to grant patent right for invention in CN202411126960.2, Apr. 4, 2025.

*Primary Examiner* — Jurie Yun
(74) *Attorney, Agent, or Firm* — Hemisphere Law, PLLC; Zhigang Ma

(57) ABSTRACT

A detection method and device for low carrier mobility of an insulating material, relating to a technical field of electrical property testing of insulating polymer materials, includes following steps: fixing a sample; applying a triangular wave voltage to both ends of the sample; irradiating the sample by an X-ray to generate carriers inside the sample, in which, the carriers is driven to move under an action of the triangular wave voltage, and an irradiation process of the X-ray coincides with a rising phase of the triangular wave voltage; acquiring a current signal of the sample under the action of the triangular wave voltage; and calculating a carrier mobility based on the current signal. The detection method and device for low carrier mobility of the insulating material achieves accurate detection of behaviors of the carriers inside the insulating material by combining X-ray excitation with voltage signal analysis.

7 Claims, 4 Drawing Sheets

DETECTION METHOD AND DEVICE FOR LOW CARRIER MOBILITY OF INSULATING MATERIAL

CROSS-REFERENCE TO RELATED APPLICATION

This application claims priority to Chinese Patent Application No. 202411126960.2, filed Aug. 16, 2024, which is herein incorporated by reference in its entirety.

TECHNICAL FIELD

The disclosure relates to the technical field of electrical performance testing of insulating polymer materials, and more particularly to a detection method and a device for low carrier mobility of an insulating material.

BACKGROUND

In modern electronic devices and power systems, insulating materials are widely used due to excellent insulating performance and chemical stability. The insulating materials play a crucial role in cable insulation, transformers, and electronic components, ensuring a safe transmission of electric current and a stable operation of equipment. With a continuous development of technologies, performance requirements for the insulating materials are gradually increasing. Especially in high-voltage and high-frequency applications, the insulating materials need to maintain excellent electrical and mechanical performance under more stringent conditions.

Carrier mobility, as an important electrical parameter, refers to an ability of charge carriers inside a material to move under an action of an applied electric field. The carrier mobility directly affects an electrical conductivity and an electrical resistance of the insulating materials in a high electric field environment. High carrier mobility may lead to increase in the electrical conductivity of the insulating materials, thereby reducing insulation performance and resulting in leakage current and power loss. However, low carrier mobility helps to improve the insulation performance of the insulating material, and reduce the leakage current, thereby enhancing safety and reliability of a device.

With a development of novel functional materials, accurate measurement of the carrier mobility has become a key step in material selection and performance optimization. Whether the insulating materials are used in microelectronic devices or high-voltage power transmission, understanding the carrier mobility of the insulating materials can help engineers design a more efficient and reliable system, therefore not only improving energy utilization efficiency, but also prolonging a service life of the equipment and reducing a maintenance cost.

However, measurement methods in related art have apparent problems of insufficient sensitivity and accuracy when measuring the insulating materials with low carrier mobility. Because of weak changes in current, it is difficult for measurement technologies in related art to provide reliable data. This technical bottleneck limits a comprehensive assessment of material performance and hinders development and application of the novel insulation materials. Therefore, a measurement method with higher accuracy and sensitivity is urgently required in related art to meet a growing industrial demand.

SUMMARY

The disclosure aims to provide a detection method and a device for low carrier mobility of an insulating material, by combining X-ray excitation with voltage signal analysis to achieve accurate detection of behaviors of carriers inside the insulating material.

To achieve aforementioned objectives, the disclosure adopts following technical solutions.

In one aspect of the disclosure, a detection method for low carrier mobility of the insulating material is provided, and the detection method for low carrier mobility of the insulating material includes following steps:

fixing a sample;

applying a triangular wave voltage to both ends of the sample;

irradiating the sample by using an X-ray to generate carriers inside the sample, driving the carriers to move under an action of the triangular wave voltage; in which an irradiation process of the X-ray coincides with a rising phase of the triangular wave voltage;

acquiring a current signal of the sample under the action of the triangular wave voltage; and calculating a carrier mobility based on the current signal, in which, a calculation equation of the carrier mobility u is expressed as follows:

$$\mu = \frac{I}{neE}$$

where, I represents a measured current, n represents a carrier concentration, e represents an elementary charge, and E represents an electric field strength;

an amplitude of the triangular wave voltage is determined according to a rated breakdown voltage of the sample; and the amplitude of the triangular wave voltage is 70% of the rated breakdown voltage of the sample.

In an embodiment, the X-ray is generated by an X-ray tube; and an operating voltage of the X-ray tube is greater than or equal to 80 kilovolts (kV).

In an embodiment, a thickness of the sample is less than or equal to 500 micrometers (μm).

In an embodiment, a time of the irradiating by the X-ray on the sample is 0.5 seconds(s).

In an embodiment, the calculating a carrier mobility based on the current signal includes:

calculating the carrier mobility by a filtering and denoising process based on the current signal.

In another aspect of the disclosure, a detection device for low carrier mobility of the insulating material is provided, and the detection device for low carrier mobility of the insulating material includes following components:

a sample fixture, in which the sample fixture is configured to fix the sample;

a voltage generation component, in which the voltage generation component is configured to be connected with the sample to apply the triangular wave voltage to both ends of the sample;

an X-ray excitation component, in which the X-ray excitation component is configured to generate the X-ray to irradiate the sample; the X-ray is configured to, under the irradiation of the X-ray, drive the sample to generate the carriers inside the sample; the triangular wave voltage is configured to, drive the carriers to move; and the irradiation process of the X-ray coincides with the rising phase of the triangular wave voltage;

a signal acquisition component, connected to the sample, in which the signal acquisition component is configured to acquire the current signal generated by movement of the carriers inside the sample; and a data process component, connect with the signal acquisition component, in which the data process component is configured to calculate the carrier mobility based on the current signal;

the calculation equation of the carrier mobility u is expressed as follows:

$$\mu = \frac{I}{neE}$$

where, I represents the measured current, n represents the carrier concentration, e represents the elementary charge, and E represents the electric field strength; and the amplitude of the triangular wave voltage applied to the both ends of the sample by the voltage generation component is determined according to the rated breakdown voltage of the sample; and the amplitude of the triangular wave voltage is 70% of the rated breakdown voltage of the sample.

In an embodiment, the X-ray excitation component is configured to be the X-ray tube, and the operating voltage of the X-ray tube is greater than or equal to 80 kV.

The disclosure has following beneficial effects.

(1) The disclosure achieves high sensitivity measurement. An X-ray source with adjustable energy is used to effectively excite the carriers inside the insulating material, therefore improving a sensitivity of a measurement. Compared with measurement methods in related art, the disclosure can more accurately detect the behaviors of the carriers inside the insulating material.

(2) The disclosure has accuracy and stability. A programmable triangular wave voltage is applied to the insulating material to accurately control the movement of the carriers. A coincidence of the rising phase of the triangular wave voltage and the irradiation process of the X-ray ensures stability and consistency of data.

(3) The disclosure has wide applicability. The disclosure is applicable to different types of insulating materials. Especially when the thickness of the sample does not exceed 500 μm, the disclosure can accurately measure the carrier mobility of various materials.

Through aforementioned beneficial effects, the disclosure provides a powerful tool for research and development of the insulating materials, promotes a development of material science field, and meets urgent needs in related art for detections of high-performance insulating materials.

Figure 1:
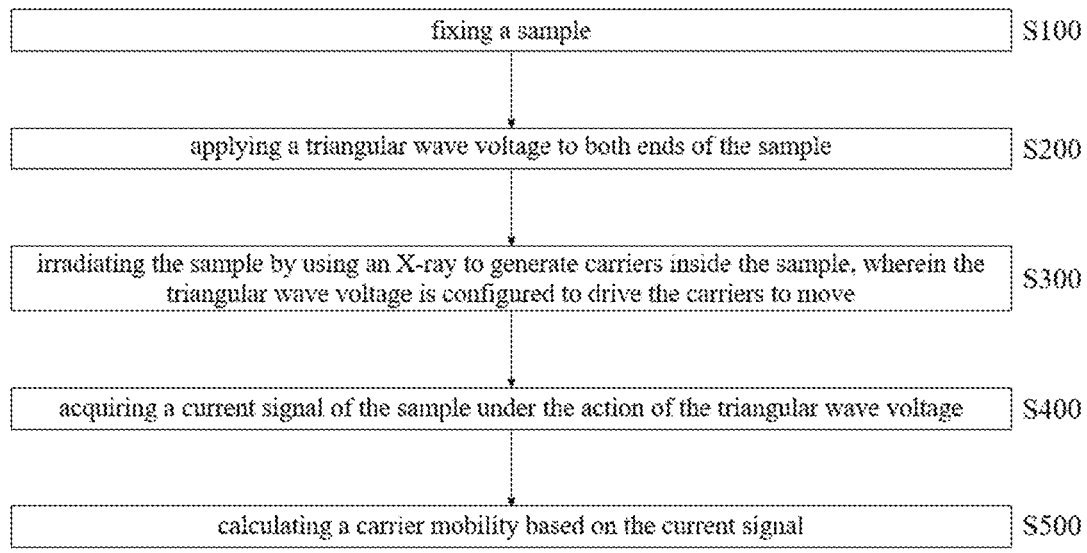
FIG. 1 illustrates a flowchart of a detection method for low carrier mobility of an insulating material according to an embodiment of the disclosure.

Description of reference numerals: 301: fixture plate; 302: fixture slot; 303: clamping piece; 304: wiring port; 305: sample; 501: sample fixture; 502: voltage generation component; 503: X-ray excitation component; 504: signal acquisition component; 505: data process component.

DETAILED DESCRIPTION OF EMBODIMENTS

Implementation of the disclosure will be described through specific embodiments. Those skilled in the art can easily understand other advantages and effects of the disclosure from content disclosed in the specification. The disclosure can be implemented or applied through other different specific embodiments. All details in the specification can be modified or variated in various ways based on different viewpoints and applications without departing from a spirit of the application. It should be noted that, in case of no conflict, the following embodiments and features in the embodiments can be combined with each other.

Specific implementation of the disclosure will be further described below in detail with reference to attached drawings and embodiments.

Figure 2:
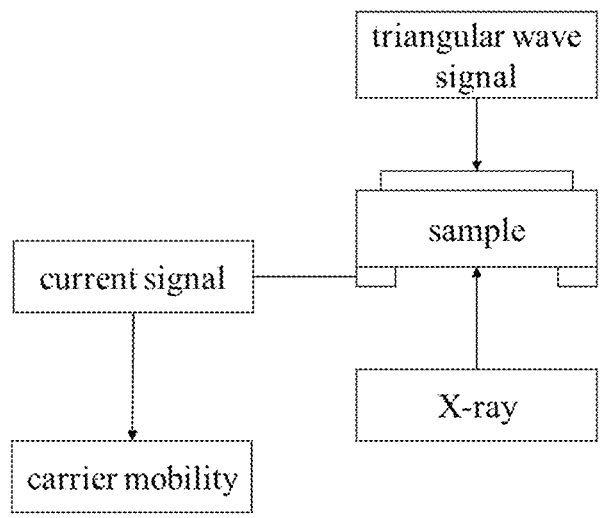
FIG. 2 illustrates a schematic working principle diagram of the detection method for low carrier mobility of the insulating material according to the embodiment of the disclosure.

FIG. 1 illustrates a flow chart of a detection method for low carrier mobility of an insulating material according to an embodiment of the disclosure. FIG. 2 illustrates a schematic working principle diagram of the detection method for low carrier mobility of the insulating material according to the embodiment of the disclosure. The disclosure provides the detection method for low carrier mobility of the insulating material, by combining X-ray excitation with voltage signal analysis to achieve accurate detection of behaviors of carriers inside the insulating material. As illustrated in FIG. 1 and FIG. 2, the detection method for low carrier mobility of the insulating material includes following steps.

S100, a sample is fixed.

In the embodiment, a sample fixture is configured to fix the sample to ensure good contact between electrodes and a surface of the sample, therefore ensuring accuracy of measurement. The sample is made of the insulating material, and a specific structure of the sample fixture is determined according to a structural shape of the sample.

Figure 3:
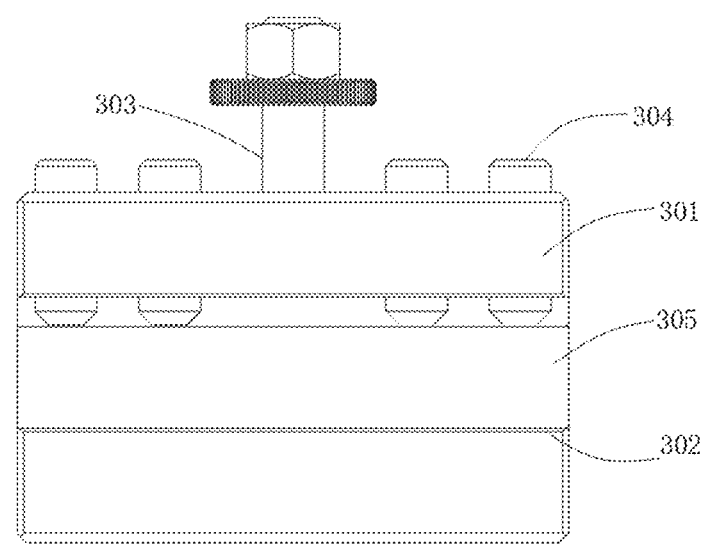
FIG. 3 illustrates a schematic diagram of a sample fixture according to the embodiment of the disclosure.
Figure 6:
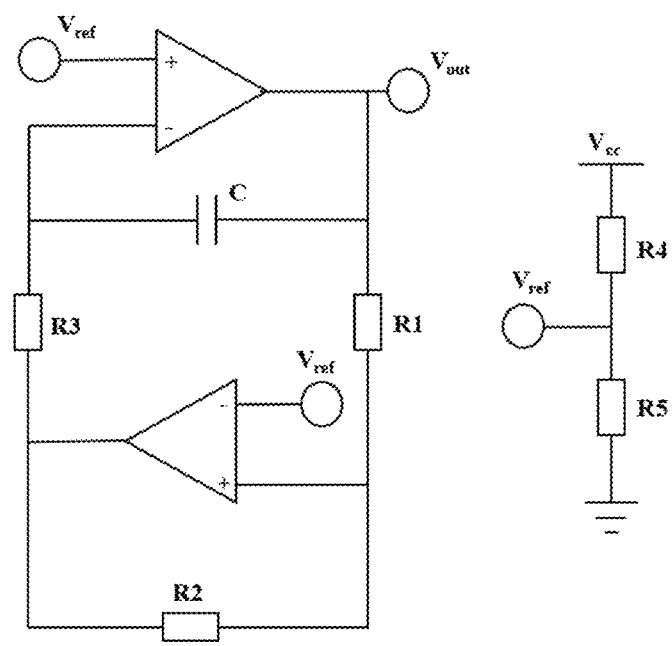
FIG. 6 illustrates a schematic circuit diagram of a voltage generation component according to the embodiment of the disclosure.
Figure 7:
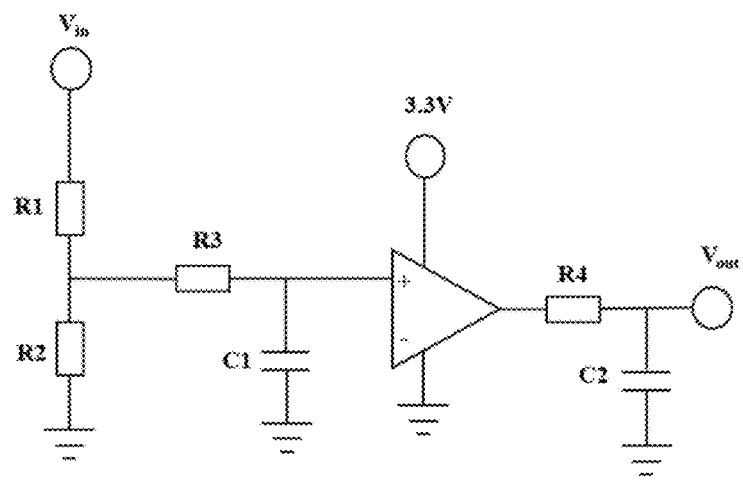
FIG. 7 illustrates a schematic circuit diagram of a signal acquisition component according to the embodiment of the disclosure.

In an embodiment, FIG. 3 illustrates a schematic diagram of the sample fixture according to the embodiment of the disclosure. As illustrated in FIG. 3, the sample fixture includes a fixture plate 301. A fixture slot 302 is defined on the fixture plate 301. A clamping piece 303 is disposed on the fixture plate 301 corresponding to the fixture slot 302, and the clamping piece 303 can be configured to be a screw. The screw is movably disposed on the fixture plate 301 through a screw hole defined on the fixture plate 301. Multiple wiring ports 304 are disposed on the fixture plate 301 corresponding to the fixture slot 302. The clamping piece 303 is configured to fix the sample 305 in the fixture slot 302. The multiple wiring ports 304 are configured to route out wires connected to the sample 305. In an embodiment, when the sample 305 needs to be connected to a voltage generation component (as illustrated in FIG. 6 for circuit principle) and a signal acquisition component (as illustrated in FIG. 7 for circuit principle) respectively through wires, the multiple wiring ports 304 can route out the wires to correspondingly connect the sample 305 to the voltage generation component and the signal acquisition component. Since both ends of the fixture slot 302 are not closed and a triangular wave voltage is applied to both ends of the sample 305, wires connected the sample 305 to the voltage generation component can directly pass through the both ends of the fixture slot 302.

S200, the triangular wave voltage is applied to the both ends of the sample.

In the embodiment, the voltage generation component is configured to apply the triangular wave voltage to the both ends of the sample by a way of connecting the sample with wire. Appropriate frequency and amplitude of the triangular wave voltage can be chosen to optimize measurement conditions. In an embodiment, the voltage generation component includes a voltage source and a signal generation system, and the signal generation system is configured to control the voltage source to generate a triangular wave signal with a set frequency and amplitude. In an embodiment, a frequency of the triangular wave voltage is set to 0.5 Hertz (Hz). An amplitude of the triangular wave voltage is determined according to a rated breakdown voltage of the sample, specifically, the amplitude of the triangular wave voltage is 70% of the rated breakdown voltage of the sample. For example, when a rated breakdown voltage of a sample with a thickness of 500 micrometers (µm) is 10 kilovolts (kV), correspondingly, an amplitude of an applied triangular wave voltage is 7 kV.

S300, the sample is irradiated by using an X-ray to generate carriers therein, the carriers are driven by an action of the triangular wave voltage to move.

Figure 4:
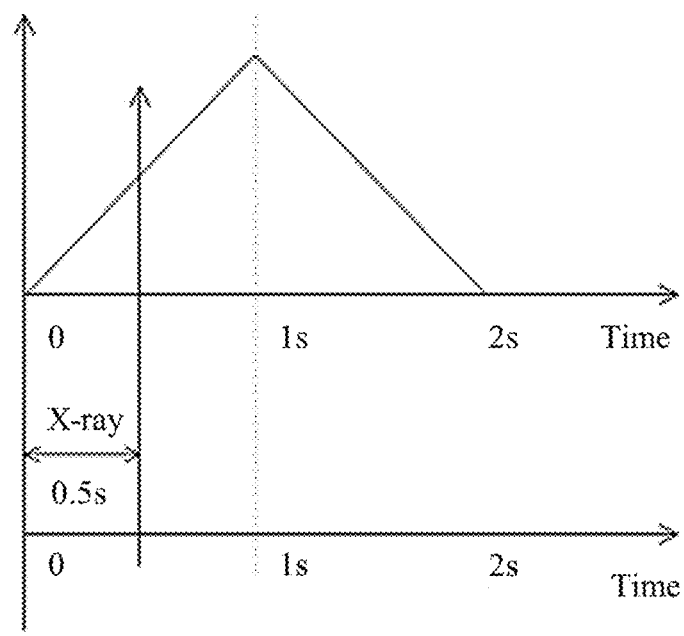
FIG. 4 illustrates an application timing chart of a triangular wave voltage applied to an X-ray according to the embodiment of the disclosure.

In the embodiment, FIG. 4 illustrates an application timing chart of a triangular wave voltage applied to an X-ray according to the embodiment of the disclosure. As illustrated in FIG. 4, an irradiation process of the X-ray coincides with a rising phase of the triangular wave voltage, and an irradiation time of the X-ray on the sample is 0.5 seconds(s). The X-ray is generated by an X-ray tube; and an operating voltage of the X-ray tube is greater than or equal to 80 kV to ensure excitation efficiency.

S400, a current signal of the sample under the action of the triangular wave voltage is acquired.

In the embodiment, the signal acquisition component is configured to acquire the current signal of the sample under the action of the triangular wave voltage. The signal acquisition component can be configured to be a current sensor. When the signal generation component is used to apply the triangular wave voltage to the sample, the current sensor can be disposed in a circuit connecting the signal generation component to the sample. The current sensor can further adopt a separate measuring circuit to achieve an acquisition of the current signal. The content here is merely an example and does not constitute a limitation to the disclosure.

S500, a carrier mobility is calculated based on the current signal.

In the embodiment, the carrier mobility is calculated by a filtering and denoising process based on the current signal.

A calculation equation of the carrier mobility u is expressed as follows:

$$\mu = \frac{I}{neE}$$

where, I represents a measured current, n represents a carrier concentration (a property of the insulating material itself, which can be obtained by looking up tables or through theoretical calculations), e represents an elementary charge, and E represents an electric field strength.

In summary, the disclosure achieves a high accurate measurement of the carrier mobility of the insulating material, and has a wide application value and prospect.

Feasibility and advancement of the disclosure will be further illustrated below with reference to specific experiments.

Based on aforementioned methods, a cross-linked polyethylene material sample and a polypropylene material sample with known carrier mobility values are selected for multiple test experiments. Size parameters of the cross-linked polyethylene material sample and the polypropylene material sample are the same, with a thickness of 200 µm, a length of 10 centimeters (cm), and a width of 10 cm. In each of the multiple test experiments, core parameters are set differently. The core parameters include an excitation voltage of the X-ray, an excitation time, the amplitude of the triangular wave voltage and the frequency of the triangular wave voltage. The current signal in each of the multiple test experiments is recorded, and the carrier mobility is calculated based on the current signal. Test results for the cross-linked polyethylene material sample and the polypropylene material sample are shown in table 1 and table 2.

TABLE 1

Test results for the cross-linked polyethylene material sample

| experiment serial number | excitation voltage of X-ray/kV | excitation time/s | amplitude of triangular wave voltage/ volt (V) | frequency of triangular wave voltage/Hz | current signal/ ampere (A) | carrier mobility/ V · s |
|---|---|---|---|---|---|---|
| 1 | 80  | 1   | 600 | 0.5 | $2.1 \times 10^{-9}$  | $1.31 \times 10^{-7}$ |
| 2 | 80  | 0.5 | 800 | 1   | $2.06 \times 10^{-9}$ | $1.29 \times 10^{-7}$ |
| 3 | 120 | 1   | 600 | 0.5 | $2.03 \times 10^{-9}$ | $1.27 \times 10^{-7}$ |
| 4 | 120 | 0.5 | 800 | 1   | $2 \times 10^{-9}$    | $1.25 \times 10^{-7}$ |
| 5 | 200 | 1   | 600 | 0.5 | $2 \times 10^{-9}$    | $1.25 \times 10^{-7}$ |
| 6 | 200 | 0.5 | 800 | 1   | $2.02 \times 10^{-9}$ | $1.26 \times 10^{-7}$ |

TABLE 2

Test results for the polypropylene material sample

| experiment serial number | excitation voltage of X-ray /kV | excitation time/s | amplitude of triangular wave voltage/ V | frequency of triangular wave voltage/Hz | current signal/(A) | carrier mobility/ V · s |
|---|---|---|---|---|---|---|
| 1 | 80 | 1 | 600 | 0.5 | $3.5 \times 10^{-10}$ | $2.19 \times 10^{-8}$ |
| 2 | 80 | 0.5 | 800 | 1 | $3.6 \times 10^{-10}$ | $2.25 \times 10^{-8}$ |
| 3 | 120 | 1 | 600 | 0.5 | $3.55 \times 10^{-10}$ | $2.22 \times 10^{-8}$ |
| 4 | 120 | 0.5 | 800 | 1 | $3.62 \times 10^{-10}$ | $2.26 \times 10^{-8}$ |
| 5 | 160 | 1 | 600 | 0.5 | $3.48 \times 10^{-10}$ | $2.18 \times 10^{-8}$ |
| 6 | 160 | 0.5 | 800 | 1 | $3.7 \times 10^{-10}$ | $2.31 \times 10^{-8}$ |
| 7 | 200 | 1 | 600 | 0.5 | $3.6 \times 10^{-10}$ | $2.25 \times 10^{-8}$ |
| 8 | 200 | 0.5 | 800 | 1 | $3.82 \times 10^{-9}$ | $2.39 \times 10^{-8}$ |

As shown in table 1and table 2, after the multiple test experiments, calculated values of the carrier mobility of the cross-linked polyethylene material sample and the polypropylene material sample differ little from the known carrier mobility values, proving effectiveness and accuracy of the disclosure.

Figure 5:
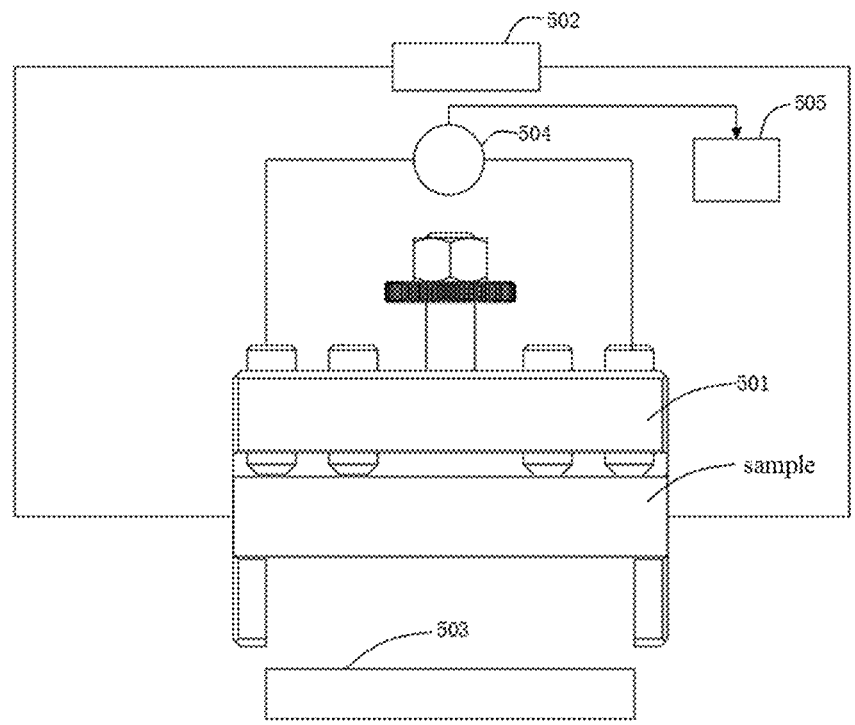
FIG. 5 illustrates a schematic structural diagram of a detection device for low carrier mobility of the insulating material according to the embodiment of the disclosure.

FIG. 5 illustrates a schematic structural diagram of a detection device for low carrier mobility of the insulating material according to the embodiment of the disclosure. The disclosure further provides the detection device for low carrier mobility of the insulating material, as illustrated in FIG. 5. The detection device for low carrier mobility of the insulating material includes: the sample fixture 501, the voltage generation component 502, an X-ray excitation component 503, the signal acquisition component 504, and a data process component 505.

The sample fixture 501 is configured to fix the sample.

The voltage generation component 502 is configured to be connected to the sample to apply the triangular wave voltage to the both ends of the sample.

The X-ray excitation component 503 is configured to generate the X-ray to irradiate the sample; in which the X-ray is configured to, under the irradiation of the X-ray, drive the sample to generate the carriers inside the sample; the triangular wave voltage is configured to drive the carriers to move; and the irradiation process of the X-ray coincides with the rising phase of the triangular wave voltage.

The signal acquisition component 504, connected to the sample, is configured to acquire the current signal generated by the movement of the carriers inside the sample.

The data process component 505, connected to the signal acquisition component 504, is configured to calculate the carrier mobility based on the current signal.

In an embodiment, the amplitude of the triangular wave voltage applied to the both ends of the sample by the voltage generation component 502 is determined according to the rated breakdown voltage of the sample.

In an embodiment, the X-ray excitation component 503 is configured to be the X-ray tube, and an operating voltage of the X-ray tube is greater than or equal to 80 kV.

Embodiments described above are merely used to illustrate the disclosure, and are not to limit the disclosure. Those skilled in the art can make modification and variation to the embodiments without departing from the spirit and scope of the disclosure. Therefore, all equivalent technical solutions fall with a scope of protection of the disclosure, and the scope of protection of the disclosure is defined by the claims.

What is claimed is:

1. A detection method for carrier mobility of an insulating material, comprising:

fixing a sample;

applying a triangular wave voltage to both ends of the sample;

irradiating the sample by using an X-ray to generate carriers inside the sample, and driving the carriers to move under an action of the triangular wave voltage; wherein an irradiation process of the X-ray coincides with a rising phase of the triangular wave voltage;

acquiring a current signal of the sample under the action of the triangular wave voltage; and calculating a carrier mobility based on the current signal; wherein a calculation equation of the carrier mobility μ is expressed as follows:

$$\mu = \frac{I}{neE}$$

where, I represents a measured current, n represents a carrier concentration, e represents an elementary charge, and E represents an electric field strength;

an amplitude of the triangular wave voltage is determined according to a rated breakdown voltage of the sample; and the amplitude of the triangular wave voltage is 70% of the rated breakdown voltage of the sample.

2. The detection method for carrier mobility of the insulating material as claimed in claim 1, wherein the X-ray is generated by an X-ray tube; and an operating voltage of the X-ray tube is greater than or equal to 80 kilovolts (kV).

3. The detection method for carrier mobility of the insulating material as claimed in claim 1, wherein a thickness of the sample is less than or equal to 500 micrometers (μm).

4. The detection method for carrier mobility of the insulating material as claimed in claim 1, wherein a time of the irradiating by the X-ray on the sample is 0.5 seconds(s).

5. The detection method for carrier mobility of the insulating material as claimed in claim 1, wherein the calculating a carrier mobility based on the current signal comprises:

calculating the carrier mobility by a filtering and denoising process based on the current signal.

6. A detection device for carrier mobility of an insulating material, comprising:

a sample fixture, wherein the sample fixture is configured to fix a sample;

a voltage generation component, wherein the voltage generation component is configured to be connected to the sample to apply a triangular wave voltage to both ends of the sample;

an X-ray excitation component, wherein the X-ray excitation component is configured to generate an X-ray to irradiate the sample; the X-ray is configured to, under an irradiation of the X-ray, drive the sample to generate carriers inside the sample; the triangular wave voltage is configured to drive the carriers to move; and an irradiation process of the X-ray coincides with a rising phase of the triangular wave voltage;

a signal acquisition component, connected to the sample, wherein the signal acquisition component is configured to acquire a current signal generated by movement of the carriers inside the sample; and a data process component, connected to the signal acquisition component, wherein the data process component is configured to calculate a carrier mobility based on the current signal, wherein a calculation equation of the carrier mobility $\mu$ is expressed as follows:

$$\mu = \frac{I}{neE}$$

where, I represents a measured current, n represents a carrier concentration, e represents an elementary charge, and E represents an electric field strength;

an amplitude of the triangular wave voltage applied to the both ends of the sample by the voltage generation component is determined according to a rated breakdown voltage of the sample; and the amplitude of the triangular wave voltage is 70% of the rated breakdown voltage of the sample.

7. The detection device for carrier mobility of the insulating material as claimed in claim 6, wherein the X-ray excitation component is configured to be an X-ray tube, and an operating voltage of the X-ray tube is greater than or equal to 80 kV.

* * * * *